United States Patent [19]

Mitsubuchi et al.

[11] Patent Number: 5,608,846
[45] Date of Patent: Mar. 4, 1997

[54] FUZZY RULE GENERATOR

[75] Inventors: Keiji Mitsubuchi; Satoru Isaka, both of Santa Clara, Calif.

[73] Assignee: Omron Corporation, Nagakakyo, Japan

[21] Appl. No.: 535,328

[22] Filed: Sep. 27, 1995

Related U.S. Application Data

[63] Continuation of Ser. No. 8,583, Jan. 25, 1993, abandoned.

[51] Int. Cl.⁶ .............................. G06F 9/44; G06F 17/00; G06F 15/00
[52] U.S. Cl. .............................. 395/75; 395/61; 395/900; 395/76
[58] Field of Search ........................... 395/51, 76, 900

[56] References Cited

U.S. PATENT DOCUMENTS

| | | | |
|---|---|---|---|
| 4,837,725 | 6/1989 | Yamakawa | 395/3 |
| 5,179,634 | 1/1993 | Matsunaga et al. | 395/61 |
| 5,189,728 | 2/1993 | Yamakawa et al. | 395/76 |
| 5,267,348 | 11/1993 | Someya et al. | 395/76 |
| 5,295,061 | 3/1994 | Katayama et al. | 395/900 |

OTHER PUBLICATIONS

IFES '91; *Fuzzy Engineering Toward Human Friendly Systems;* "A Self–Generating Method of Fuzzy Interference Rules", Shoicki Araki et al., 1991.

*Primary Examiner*—Robert W. Downs
*Attorney, Agent, or Firm*—Dickstein Shapiro Morin & Oshinsky LLP

[57] ABSTRACT

This invention relates to an apparatus and method for generating membership functions and rules for a fuzzy system whereby fuzzy rules and membership functions are synthesized by observing a sample output/input data array and by creating new fuzzy sets which closely approximate various data associations in accordance with maximum inference error calculations. Applications of this system are provided in a temperature controller, a vehicle suspension controller, and a neural network/fuzzy rule converter device.

20 Claims, 13 Drawing Sheets max error

=> max error

=>

● new rules
○ initial rules

FUZZY RULE GENERATOR

This application is a continuation of application Ser. No. 08/008,583, filed Jan. 25, 1993, now abandoned.

FIELD OF THE INVENTION

This invention relates to an apparatus and method for generating membership functions and rules for a fuzzy system. More particularly, this invention relates to a generator that synthesizes a fuzzy system by observing sample input-output data and by creating new fuzzy sets which closely approximate the given data associations. The apparatus processes fuzzy sets with minimum prior knowledge data or with little required expertise of the system while automating fuzzy system rule generation and tuning.

BACKGROUND OF THE INVENTION

A fuzzy system is an information processing system which consists of fuzzy sets and their associations. Fuzzy sets are defined by membership functions, and associations of fuzzy sets are represented in a form of "if-then" rules. A fuzzy system is typically designed and tuned by a human operator who has the knowledge of a particular system's characteristics and behavior. Since the human operator can represent the system in natural language form, the fuzzy system approach provides an effective means to represent dynamic problems and solutions. Nevertheless, there is a lack of systematic ways to design and tune such systems.

One solution was proposed by Araki, Nomura, Hayashi, and Wakami in their article "A Self-Generating Method of Fuzzy Inference Rules", *Proc. IFES,* pp. 1047–1058 (1991). The proposed system generates a new membership function at a point of maximum output error. However, the system generates a large number of rules when the number of inputs increases. For instance, consider a 2-input-1-output fuzzy system with 3 membership functions for each of the two input variables. Initially, there are 3×3=9 rules as depicted in the FIG. 1A. Under the above-noted methodology, tuning the system generates a new membership function for each input at a point of maximum output error. As a result, the number of rules increases to 4×4=16 as shown in FIG. 1B. This synthesis device thereby generates a relatively large number of rules for the provided data.

SUMMARY OF THE INVENTION

In view of the foregoing drawbacks, there remains a need for a fuzzy rule synthesis device that generates a relatively small number of rules than other systems and at the same time increases the system's approximation capabilities. It is therefore an object of this invention to provide a fuzzy rule generator which minimizes the number of additional rules that need to be created for each fuzzy input by adding membership functions at a maximum error point in order to determine a peak value and a width of the new membership function.

It is an additional object of this invention to determine a level of an input vector to said fuzzy system in order to determine the peak value and the membership function width.

It is a further object of this invention to adjust the peak value of the membership function to fall within the new membership function width in order to reduce the number of membership functions and to minimize the distribution and noise of those membership functions.

It is still another object of this invention to stop the fuzzy rule generator if the number of rules is more than a specified value such that if the number of rules exceeds a specified value, the resulting fuzzy system can be saved.

It is yet an additional object of the invention to employ the fuzzy rule generator of the present invention in an automatic air conditioner control to obtain a personalized temperature for an air conditioner using minimum operator knowledge for the task.

It is another object of the invention to provide an air conditioner controller which employs four modules: a learning module which enables an operator to adjust room temperature; a data gathering generator that collects the operator's inputs and generates a model datafile; a fuzzy rule generator which synthesizes the fuzzy membership functions in order to simulate the drive temperature characteristics based upon that model datafile; and a fuzzy controller to automatically regulate a heater/cooler and to process feedback data from temperature sensors.

It is a further object of this invention to provide a fuzzy rule generator which controls vehicle suspension based upon driver-provided adjustments and which regulates the suspension according to road conditions.

It is yet an additional object of this invention to employ the fuzzy rule generator of the present invention to convert a neural network to an equivalent fuzzy system by simulating the neural network input-output characteristics based on sample data sets.

Briefly described, these and other objects of the invention are obtained by employing a fuzzy rule generator which includes a system initialization module that sets an initial fuzzy system through user-defined settings or default settings. A maximum inference error calculation module is employed to calculate an inference error and a target output value. Rules and membership functions are then generated by a rule generator device and the target output value is assigned to the new rules as a weight value. The weight value is then adjusted to reduce the inference error and the termination conditions of the fuzzy system structure are then checked by the termination checking module.

In its method aspects, the present invention is accomplished by initializing the fuzzy system either by user-defined settings or a default setting, calculating an inference error by determining the absolute difference between the fuzzy system output and a target output value, and identifying a maximum inference error, input vector, and output value. The system then defines the width and peak values which are assigned to the new rule as a weight value, the rule is tuned by adjusting its respective weight value, and a new inference error is calculated in dependence on the adjusted weight value.

With these and other objects, advantages and features, the nature of the invention is more fully described below by reference to the following detailed description of the invention, the appended claims and to the several drawings attached herein.

DETAILED DESCRIPTION OF THE EMBODIMENTS

Figure 1A:
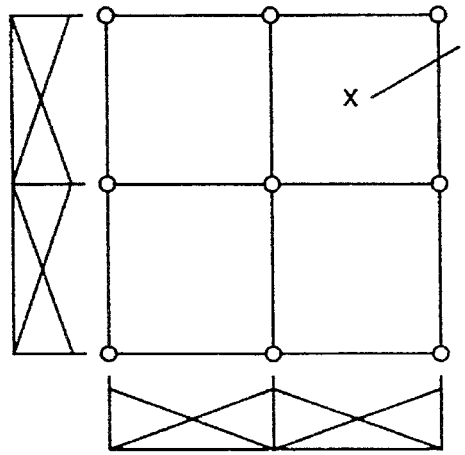
FIGS. 1A and 1B are matrices illustrating the rules structures for inputs x and y.
Figure 1B:
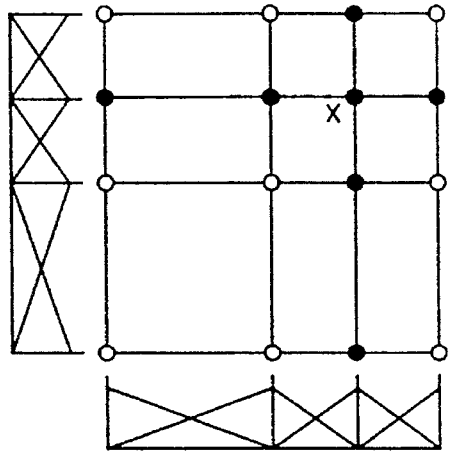
Figure 2A:
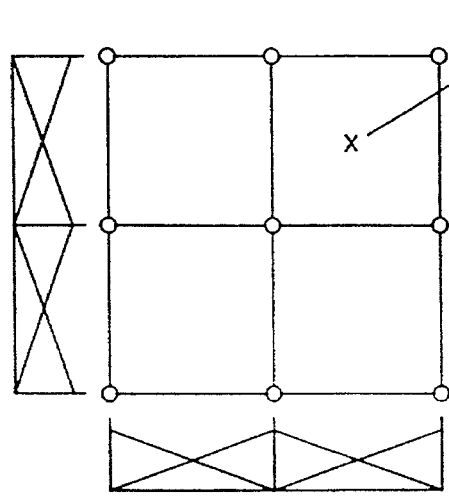
FIGS. 2A and 2B are matrices illustrating the rules structures for inputs x and y achieved by the present invention.
Figure 2B:
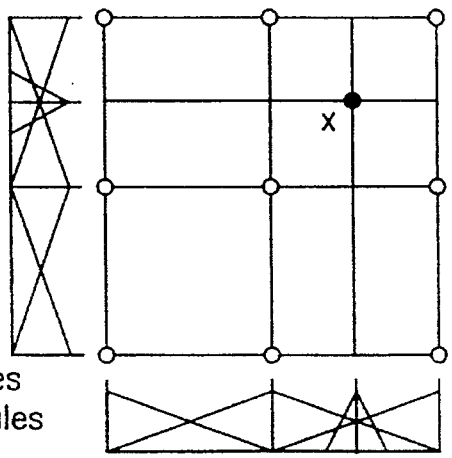

Referring now in detail to the drawings wherein like parts are designated by like reference numerals throughout, there is illustrated in FIG. 2A a matrix illustrating the efficiencies resulting from the present invention. FIG. 2A illustrates a 2-input-1-output fuzzy system having three (3) membership functions for each of the two input variables. Initially, as represented by the empty dots, there are 3×3=9 rules. As a result of the present invention, new rules generated by this apparatus and method, as represented by the single black dot in FIG. 2B, result in adding only one membership function for each of the two inputs. No additional rules need to be created. The total number of rules in the present system is significantly reduced compared to other systems.

Fuzzy logic is based on models for indeterminacy which rely and include a third or middle truth value to represent a dynamic multivalent logical framework. This multivalent approach extends to the concept of membership functions which allow the combination of multivalent fuzzy sets with the pointwise operators of indicator functions. Individual indicator values which behave as statements in multivalent propositions are represented as membership values which correspond to the continuous logic. Thus, fuzzy systems directly encode structured knowledge in a numerical framework. Fuzzy systems also directly encode structured knowledge by defining entries as a "rule".

The fuzzy system under consideration by the present invention comprises a set of fuzzy rules where the K-th fuzzy rule can be written as follows:

$$\text{If } x_1 = A_{1k}, x_2 = A_{2k}, \ldots x_n = A_{nk} \text{ then } y = w_k, k = 1, 2, \ldots m \quad (1)$$

Figure 16:
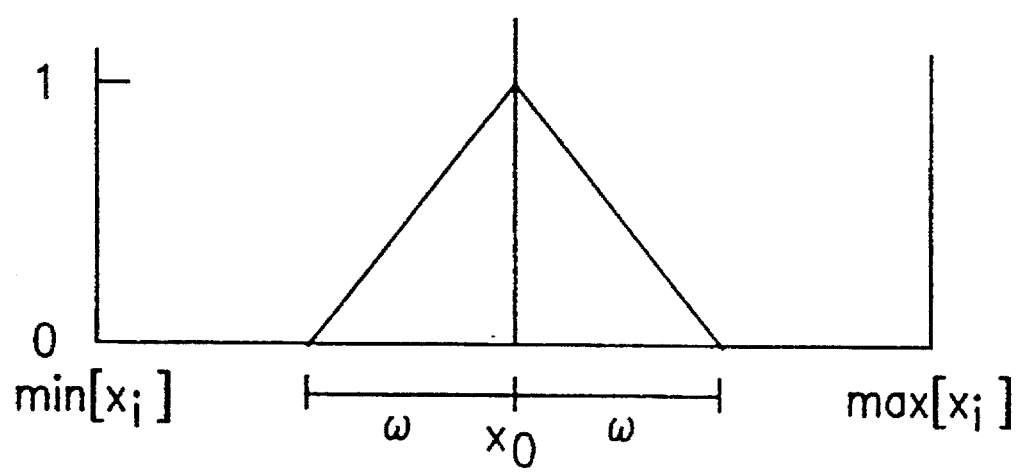
FIG. 16 is a chart representing the membership function used by the apparatus in FIG. 3.

For the fuzzy system under consideration, the output y is obtained as:

$$y = F(x) = \Sigma \mu_k + w_k / \Sigma \mu_k \quad (2)$$

where is the matching value of the k-th rule's condition part and is obtained as $$\mu_k(x) = A_{ij}(x_i), \quad (3)$$

where $A_{ij}(X_i)$ is the j-th membership function of the i-th input. The membership function is an isosceles triangle function with its center value as $x_0$ and the width W, as depicted in the chart shown in FIG. 16. The value of the membership function of FIG. 16 is calculated by $$A_{ij} = \begin{cases} 1 - (X_{i,o} - X_i)/W & \text{if } X_{i,o} - W < X_i < X_{i,o} \\ 1 + (X_{i,o} - X_i)/W & \text{if } X_{i,o} < X_i < X_{i,o} + W \\ 0 & \text{otherwise} \end{cases}$$

Figure 3:
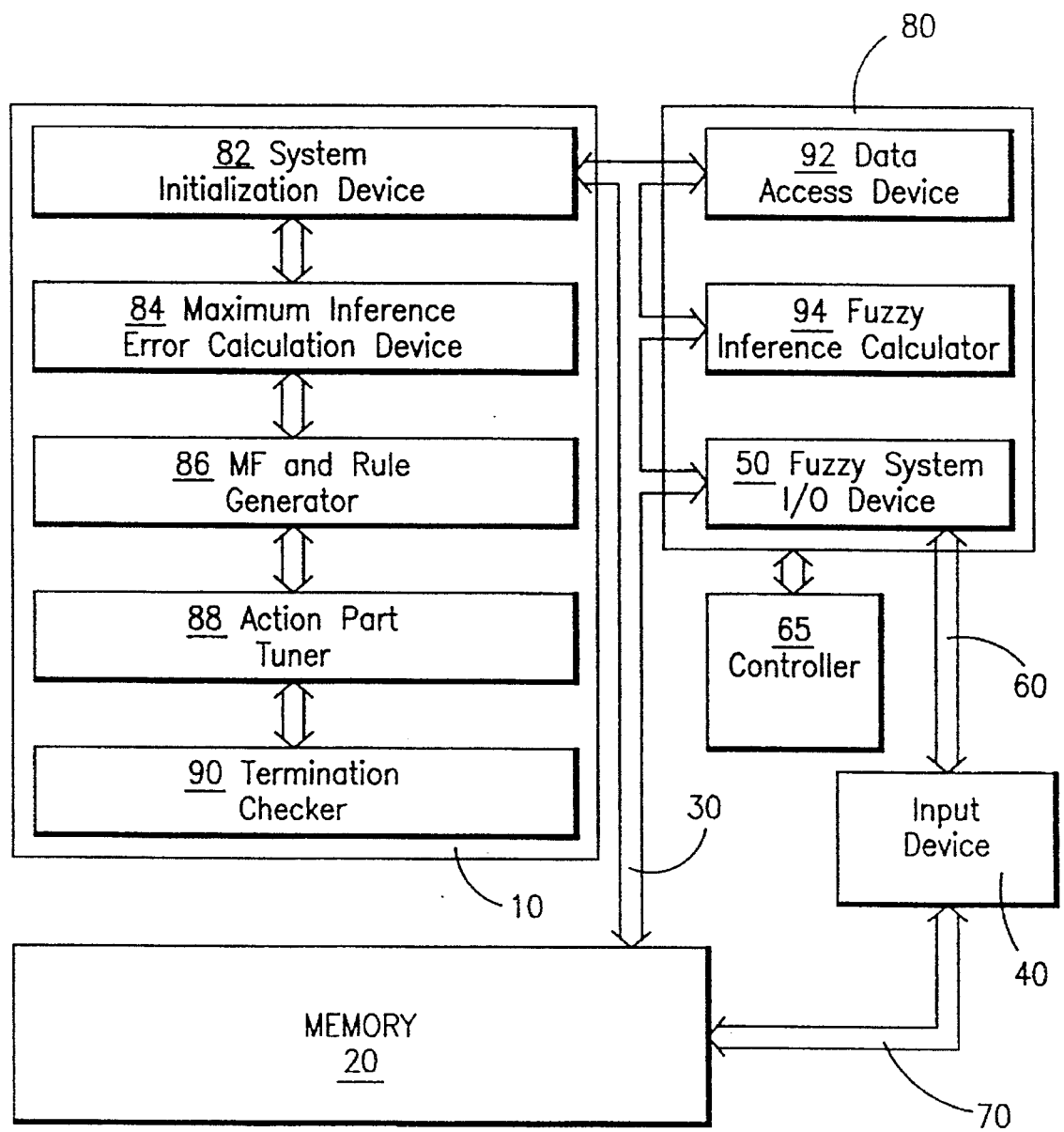
FIG. 3 is a block diagram showing the apparatus of the present invention.

Referring now to FIG. 3, there is shown in block form a diagram of a preferred embodiment of the fuzzy rule generator device according to this invention. The fuzzy rule device includes a fuzzy rule generator 10 connected to a memory 20 via a databus 30. The fuzzy rule generator also includes an input device 40 in communication with an I/O unit 50 through bus 60. The input device 40 is also connected to the memory 20 through input device bus 70. The fuzzy rule processor includes several devices which are responsible for generating rules for a fuzzy system. Each of those devices shown can be implemented in hardware, software, or a combination of the two. For example, each device can represent a separate microprocessor, a programmable logic array or another arrangement of logic circuits than can perform the system functions. The operations of the fuzzy rule processor modules are shown in further detail with reference to FIGS. 4–12.

Figure 4:
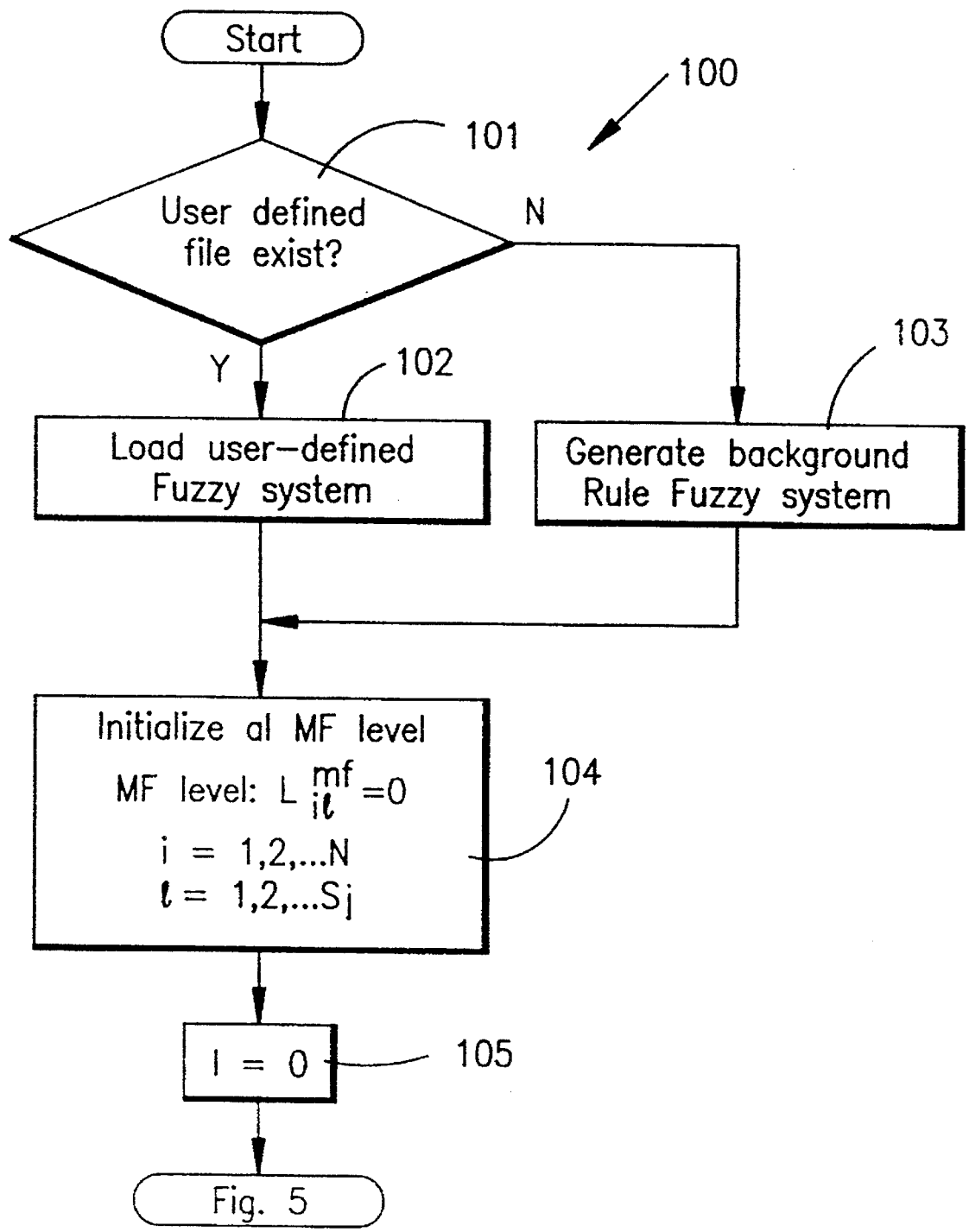
FIG. 4 is a flow diagram illustrating the sequence of steps for operation of the system initialization device shown in FIG. 3.

FIG. 4 is a block form illustration of the operations of the system initialization apparatus 82. The device 80 sets an initial fuzzy system in two ways: the system can either be set by a user-defined setting or through a default setting. The default fuzzy system setting uses a single output i.e. only one rule which is called the background rule (BG). The background rule is a rule designed to cover the entire input space of the fuzzy system. The background rule BG is a complement of the matching value of a premise for the fuzzy rules. BG can thus be written as:

If $\mu b_g = 1$, then $y = 0$ $$\text{where } \mu_{BG} = \text{MAX}\left\{ 0, 1 - \sum_{k=1}^{R} \mu_K \right\} \quad (5)$$

In addition to setting the background rule, a level is assigned as a parameter to each membership function by the maximum error inference calculation device 84. The system initialization module acts to initialize the level setting to zero (0). In addition, the system initialization module 82 sets the iteration counters to zero (0). Further operations relating to the module are described with reference to FIG. 4.

The system then calculates an inference error, which represents an absolute difference between the fuzzy system output and the target output value. To accomplish this, the target output value is read from a datafile in which the module then identifies the maximum error as well as the corresponding input vector x and the output value y. The inference error E is calculated by the formula:

$$\epsilon = \Sigma |Y_p - Y^r_p| + tm \quad (6)$$

where $Y_p$ is the fuzzy system output for the p-th input data vector and $Y^r_p$ is the p-th output data.

Membership functions are then added through the membership function and rule generator 86. This module adds new membership functions (MF) and generates fuzzy rules (FR) at a maximum error point x. In order to generate a new membership function, the system also must first generate a peak value $X_0$ and width of the newly generated MF. Additionally, an output value $y^r_{max}$ is assigned as the new rule to represent the weight value $w_k$.

The weight value $w_k$ is then adjusted in the action part tuner 88. The tuner 88 adjusts the weight values of all the fuzzy rules in order to reduce the overall inference error where adjustments can occur by any known tuning method which adjust the consequent part of the equation to a target output. A new inference error is then calculated as a result of the weight adjustment. Processing then loops back to module 82 to repeat processing until termination conditions are met. The tuning processes are further illustrated with reference to FIGS. 10, 11 and 12.

Once tuning is complete, the termination checker module 90 is referenced. The module 90 performs two tasks: to save the basic fuzzy system structure as well as to check termination conditions. To accomplish the first task, the termination checker 90 downloads the current fuzzy system structure into an external file as a basic system. Downloading occurs after a predetermined number of rules have been adjusted. To determine what conditions are appropriate for downloading, the termination conditions test the processors for two conditions: (1) if the iteration counters set in the initialization device 82 exceed a maximum iteration value or (2) if the total inference error value is less than a predetermined tolerance.

In addition to the fuzzy rule generator 10, the system also includes an input/output processor 80. The I/O processor 80 is comprised of three devices: the data access device 92, the fuzzy inference calculator 94 and the fuzzy system I/O device 50. Each of the devices 50, 92 and 94 can be implemented either in software or hardware or a combination of both. These devices are designed to load information into and receive information from memory 20 via bus 30. The fuzzy system I/O module 50 is also adapted to communicate with an input device 40 that receives and formats user inputs and process inputs (such as sensor feedback). A controller 65 is also connected to the I/O device 50 so that the fuzzy system function can be implemented to provide fuzzy control to any appropriate device or process. The controller 65, however, is only one example of an application of the present invention. The present invention can also be applied to various software applications, such as for use in predicting stock values. Details regarding various device implementations are provided with reference to FIGS. 12–15 which are discussed further below.

A data access module 92 reads input and output data from a user-provided data file stored in the memory 20 and provided through the input device 40 via bus 70. The given data set serves as a target input/output model for the fuzzy rule generator 10 in order to make approximations. In a preferred embodiment, the data file stored in memory 20 consists of ASCII floating point data. While the data file can provide any number of conventional formats, the input file is preferably organized as follows:
  i: input variable index (i=1,1, . . . N)
  N: total number of input variables
  P: data index (p=1,2, . . . Q)
  Q: total number of data
  l: index of MF
  Si: total number of MF for ith input The i-th input variable of the p-th data order is $x_{ip}$, and the corresponding output value is y.

The N input variables form a vector $x_p = (x_{1p}, x_{2p}, \ldots x_{Np})^T$.

The data file consists of ASCII floating point data in the following order:

<beginning of data file>
$x_{11}, x_{21}, \ldots, x_{N1}, y_1^r$ [New line]
$x_{12}, x_{22}, \ldots, x_{N2}, y_2^r$ [New line]
$x_{1p}, x_{2p}, \ldots, x_{Np}, y_p^4$ [New line]
$x_{1Q}, x_{2Q}, \ldots, x_{NQ}, y_Q^r$ [New line]
<end of data file>

An input variable is provided by the data access device to the system initialization device for fuzzy rule generation operations.

The data access device 92 is also connected to a fuzzy inference calculator 94. The calculator 94 determines the fuzzy system output y. Values are defined in terms of a membership function for the i-th input. Each membership function forms an isosceles triangle (as shown in conjunction with Equation 4 above) having a center value of $x_0$. In the preferred embodiment, the fuzzy system used for generating the membership function follows the isosceles structure.

The fuzzy system I/O device 50 downloads and uploads the fuzzy system structure created by the data access device 92 to and from the external memory 20.

As previously noted, the fuzzy system file contains the fuzzy structure and fuzzy system parameters in ASCII characters. The I/O module also constructs the fuzzy system file format so that parameters are appropriately assigned to the ASCII floating point data. The system file format for the preferred embodiment as identified by the fuzzy rule in Equation (2) is set forth below:

```
    ; comments
    ;
    \fuzzy "system name": type
    \input
        "input name": [# of MFs]
        "name of MF": a,b,c,d :
    \output
        "output name": [# of MFs]
        "name of MF": a, ----
    \if
        (x₁ = A₁₁)
        (x₂ = A₂₁)
        .
        .
        (xₙ = A_N1)
    \then y = W,
    \if
        (X₁ = A_1K)
        (X₂ = A_2K)
        .
        .
        (X_N = A_NK)
    \then
        (y = W_K)
    \if
        (X₁ = A_1R)
        (X₂ = A_2R)
        .
        .
        (X_N = A_NR)
    \then
        (y = W_R)
    <end of file>
```

Referring now to FIG. 4, the system initialization routine 100 is illustrated. As previously discussed with reference to FIG. 3, the system initialization device 82 can either initialize the fuzzy system from user-defined system information or can initialize the fuzzy system to a default. The advantage of the default setting is that it generates a single background rule which can answer any value for the background environment. Hence, different backgrounds can be efficiently expressed by the background rule. The routine first tests at step 101 whether a user-defined file for initialization exists. If the file exists, then, at step 102, the user defined fuzzy system file is loaded from the fuzzy system I/O module device 50 into the system initialization device 82. If a user-defined system file does not exist, then at step 103, the background rule fuzzy system is generated.

Details regarding how the background rules are generated were previously shown with reference to the system initialization device 82. Once the fuzzy system is loaded or generated, then the membership function levels are initialized equal to 0 at step 104. The iteration variable is then set and processing proceeds to determine the maximum inference error.

Figure 5:
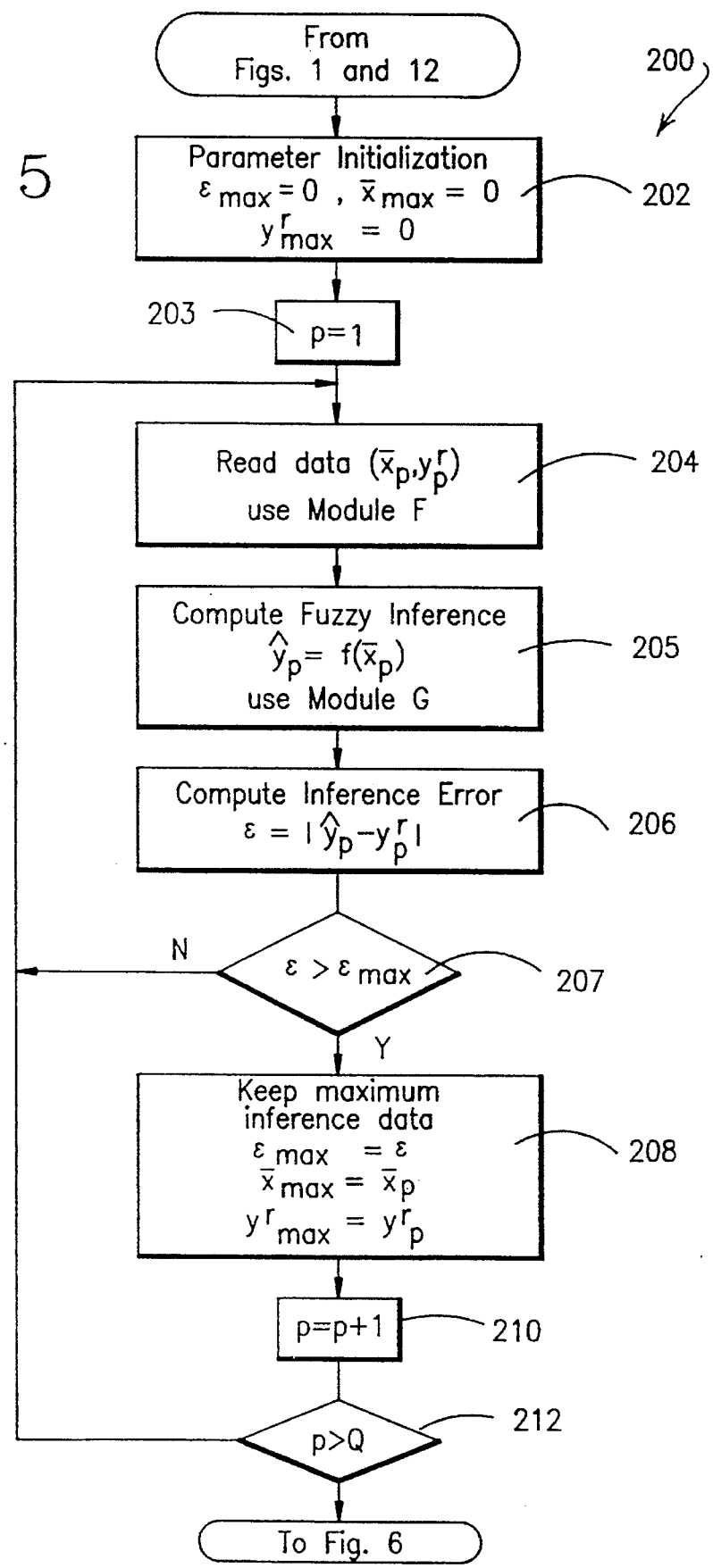
FIG. 5 is a flow diagram illustrating the operations of the maximum inference error calculation device shown in FIG. 3.

Referring now to FIG. 5, the maximum inference error process for an inference error calculation device 84 is illustrated. The process can be called either from the system initialization device 82 or from the termination checker routine illustrated in the flow chart of FIG. 12. If the call originates from the termination checker, then termination conditions have not been met. Processing thereby returns to determine the inference error.

The maximum inference error determination process begins at step 202 when the maximum inference error, the input data vector, which is attributed to the maximum inference, and the output data vector which is attributed to the maximum inference error, are set. The data index increment file is then set to an initial iteration value. Data vectors and output vectors are then read from the data access module 92. The fuzzy inference calculation module 94 is then utilized to compute the fuzzy inference outputs for a given input data vector. The inference error is then calculated between the fuzzy system inference output and the output data. The error is then tested for the maximum error value. If it is not the maximum value, then processing returns to step 204 to read in the next data vector and output vector. Otherwise, if the error value is the maximum value, then the data index iteration variable is incremented and the termination condition Q is tested. Q represents the total number of data to be processed. The processing then moves to FIG. 6.

Figure 6:
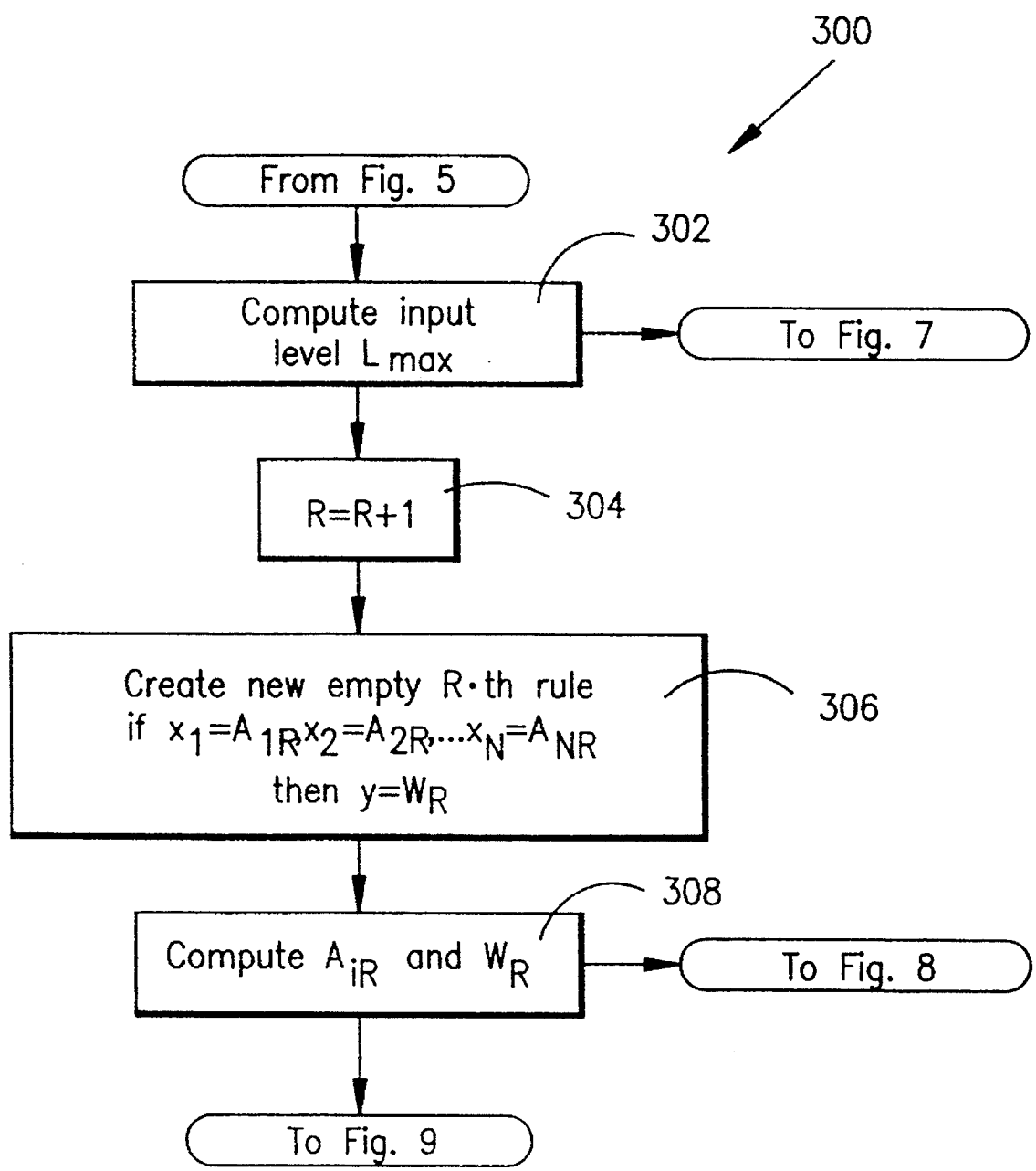
FIG. 6 is a flow diagram showing the operation of the rule generator shown in FIG. 3.
Figure 9:
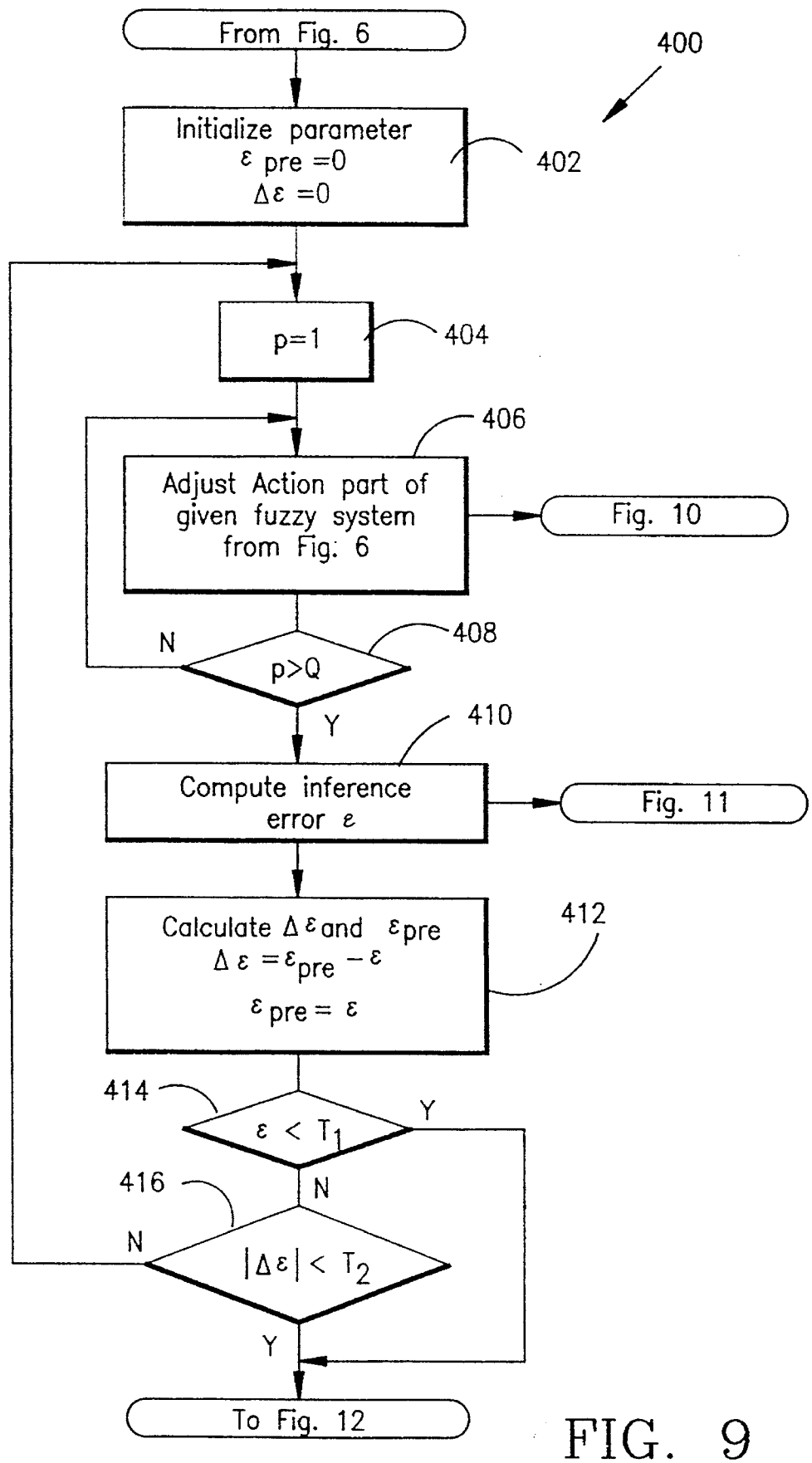
FIG. 9 is a flow diagram showing the operations of the action part tuner of FIG. 3.

FIG. 6 illustrates the membership function and rule generation process employed in module 86. Processing begins with a computation of the input level $L_{max}$. Details regarding the input level calculations steps are set forth with reference to FIG. 7. At step 304, the total number of rules is then incremented and at step 306 a new empty R-th rule is set. The empty rule is used to determine the width of the membership function $a_i^R$, the shell of which is created at step 308. Processing then proceeds to the action part tuner 88, the details of which are shown in FIG. 9.

Figure 7:
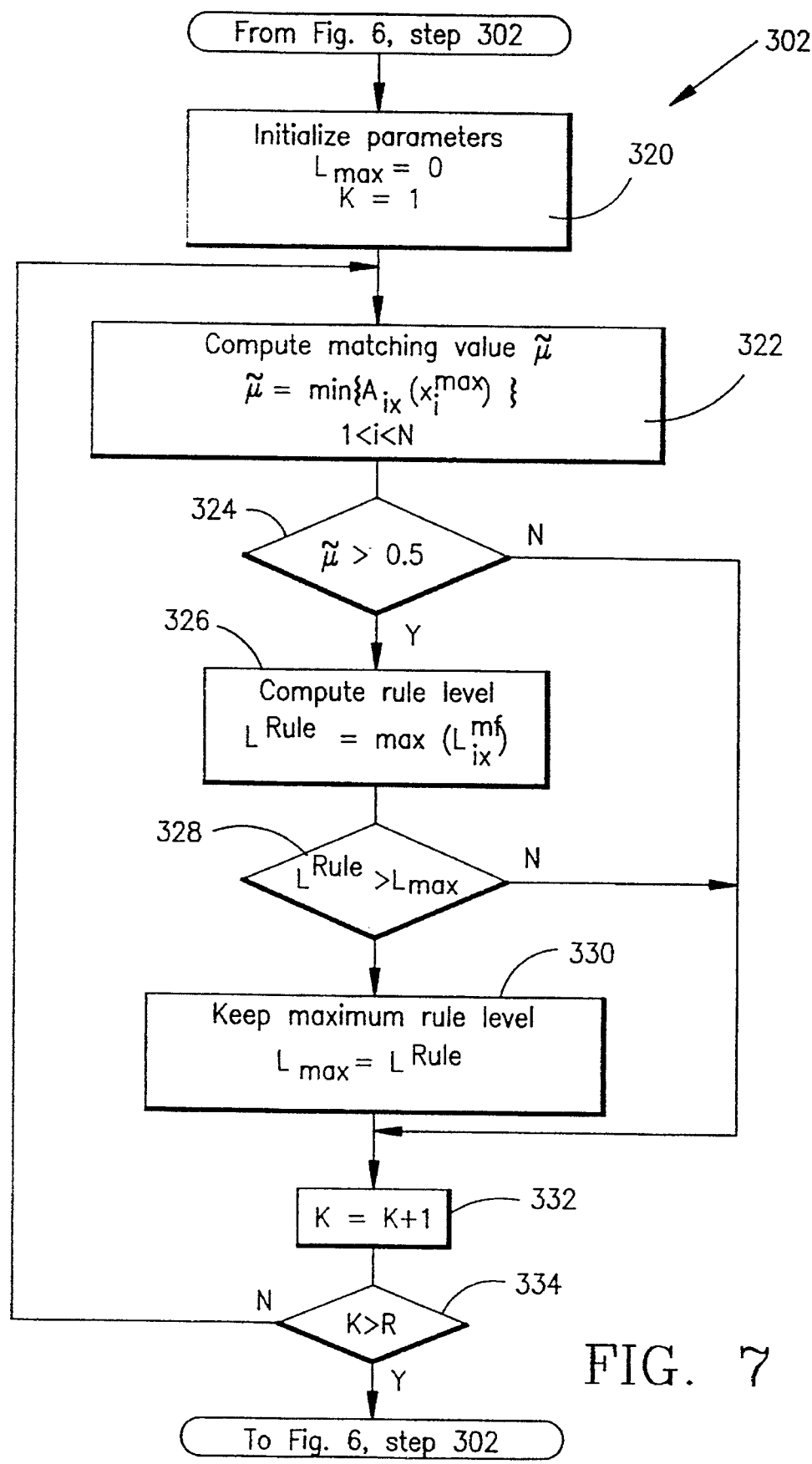
FIG. 7 is a flow diagram of the input level calculation subroutine used by the rule generator shown in FIGS. 3 and 6.

As previously noted, FIG. 7 illustrates the input level calculator process steps 302. To set the levels, the parameters are first initialized at step 320. The input level of the x vector is set to zero along with a rule index variable k (which is set to 1). A local variable for storing the matching value of the condition u is then computed. In particular, u is set to the minimum value for the input data vector for the membership function $A_{ix}$. The matching value is then compared at step 324 to the value 0.5. If the value exceeds 0.5, then the local variable rule to store the rule level ($L^{rule}$) is set equal to the maximum membership function level for the i-th input of the K-th rule. The local rule variable is then compared to the level of the maximum value for the vector x at step 328. If it exceeds that value, then the maximum rule level is stored in the memory 20 at step 330 and the index value K is incremented at step 332. The rule index value k is then compared to the termination condition variable $R_x$ where R represents the total number of rules. If K does not exceed R, then processing returns to the next rule. Otherwise, processing returns to the calling routine (FIG. 6) in order to create the empty membership function and width values.

Figure 8:
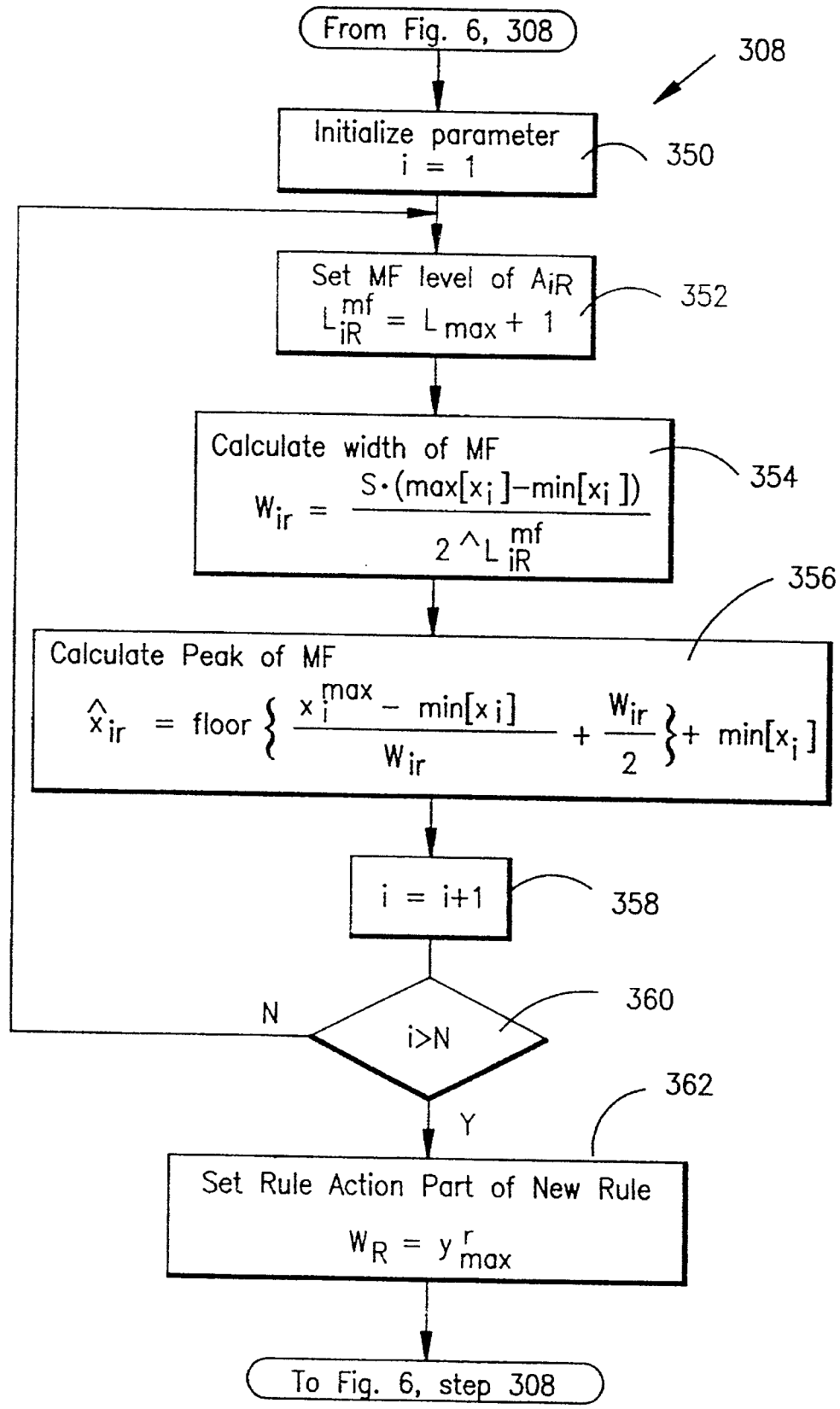
FIG. 8 is a flow diagram illustrating the membership function determination subroutine for the action part of the new rule generator of FIGS. 3 and 6.

FIG. 8 refers to the membership function and width variable calculation routine called by the rule generator 86 at step 308 (FIG. 6). As previously noted, the routine illustrated in FIG. 8 is called from step 308 in FIG. 6 which computes the membership function and width of that membership function.

Processing begins at step 350 where the input index parameter (i) is initialized. At step 352, the membership function level (MF) of the membership function $A_{iR}$ is set at a higher point than the input level variable $L_{max}$ for that particular membership function. The width of the membership function is then calculated at step 354 in accordance with the formula provided in that step. At step 356, a peak membership function value is calculated. Where max[Xi] is maximum value of i-th input and min[Xi] is the minimum value of i-th input. The input index parameter is then incremented at step 358 and is compared to the total number of inputs at step 360. If the total number of rules have been processed, then the action part of the new rule $W_R$ is set equal to the maximum output data value $y^r_{max}$ at step 362. Processing then returns to the calling routine shown in FIG. 6 at step 308 which in turn activates the action part tuner 88 and its respective process illustrated in FIG. 9.

Referring to FIG. 9, the action part tuner 88 is called after the membership function and rule generation processing steps are complete, as illustrated in FIGS. 6–8. The tuning process begins by initializing the inference error (calculated in accordance with FIG. 11) and the difference of inference error from the prior step. $E_{pre}$ is temporary variable to store E as previous data. Both are initialized to 0. The data index value is then initialized to the beginning iteration value of 1 at step 404. At step 406, the adjust action subroutine is called for adjusting the action part of the fuzzy system (determined in FIGS. 6–8). The action adjust subroutine is described in more detail with reference to FIG. 10.

Figure 11:
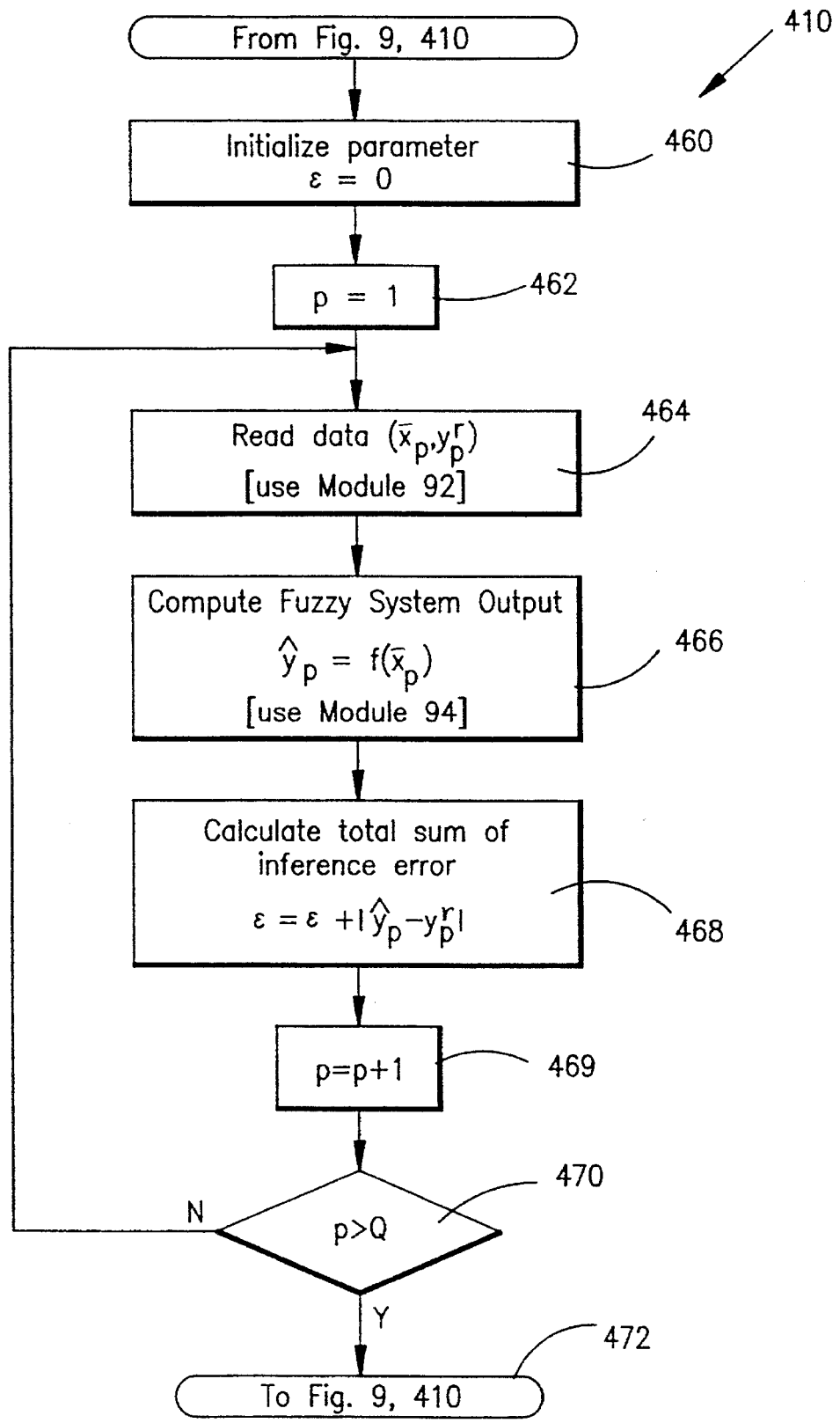
FIG. 11 is a flow diagram illustrating the subroutine for calculating inference error steps for the action tuner of FIG. 3.

Once the action part of the rule has been calculated, the data index variable P is tested to see if it exceeds the termination condition Q. If it does, then the inference error is calculated at step 410 (by recalling the inference error calculation subroutine, illustrated in detail in FIG. 11). However, if the data index has not exceeded the total data number variable Q, then further adjustment of the action part of the fuzzy system occurs when the routine loops back to step 406. Otherwise, the value for the difference of inference error from the previous inference error value, as well as the temporary error value, is calculated. The calculated error inference value E is then compared to a user-defined tolerance level for that value. If it exceeds that value, or is equal to it, then it tests to see if the absolute value of the difference is less than a second user-defined tolerance at step 416. However, if E is less than $T_1$ or the absolute value of $\Delta E$ less than $T_2$, then the termination checking processing is activated (FIG. 11). Where T1 is the user given tolerance of E to terminate process, and T2 is the user given tolerance of |ΔE| to terminate process.

Figure 10:
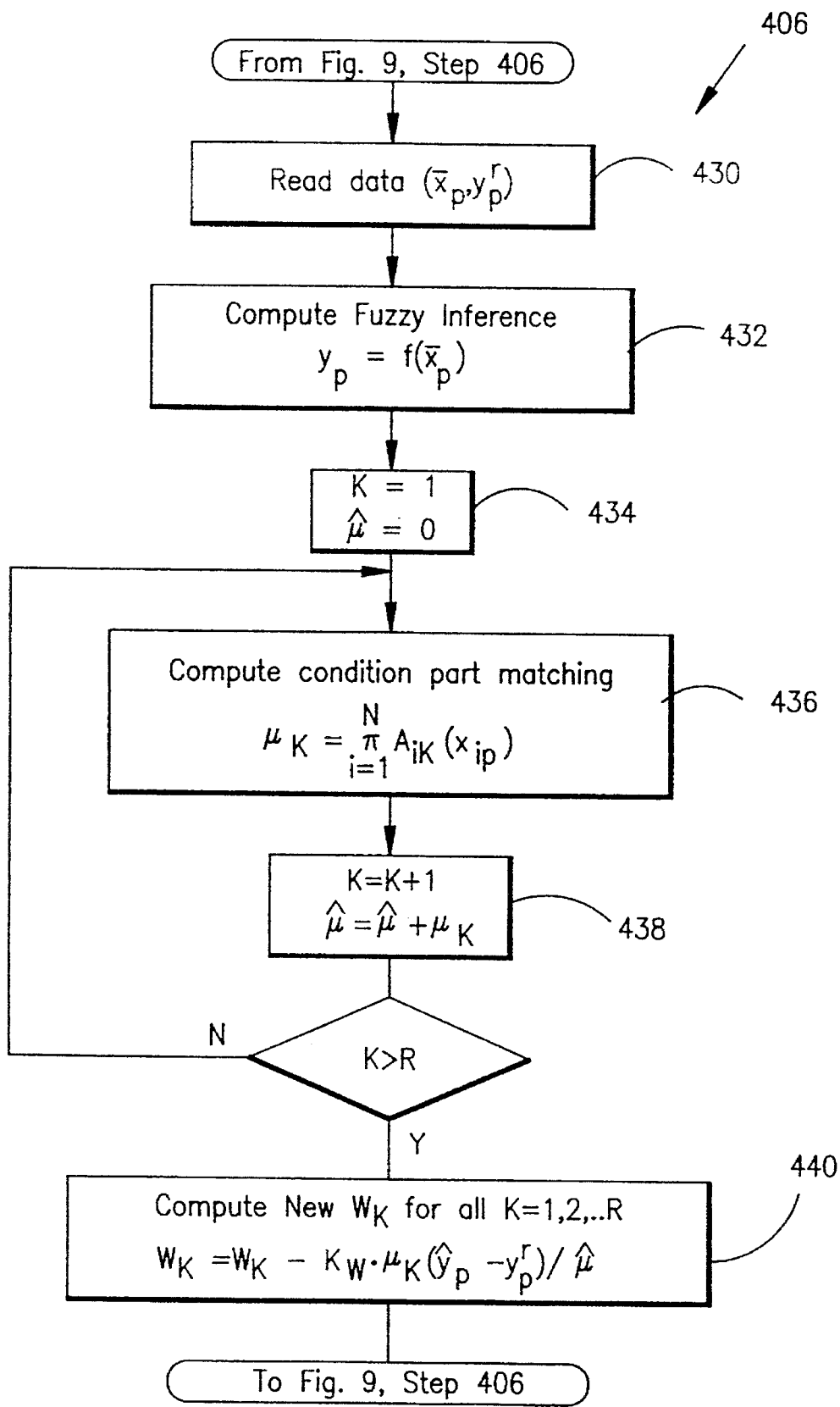
FIG. 10 is a flow diagram of a subroutine for adjusting parts used in the action part tuner of FIGS. 3 and 9.

The action part calculation, which occurs at step 406, is shown in more detail in FIG. 10. When the subroutine of FIG. 10 is called, the input data vector and output data are read from the data access module 92. Fuzzy inferences are then computed by setting the fuzzy system outputs corresponding to the input vector equal to the fuzzy system function computed by the fuzzy inference calculation module 94. At step 434, the rule index is reset as well as an accumulated value for the total sum of the condition part matching values. At step 436, the condition part matching value is then calculated for the input vector for the membership function. The rule index is then incremented at step 438 and the condition part matching value of the k-th rule is added to the temporary variable for calculating the total sum of the condition part matching values. The rule index is then compared to the total number of rules R. If the value is less than or equal to R, processing loops back to step 436 to compute the condition part matching value for the next rule. However, if K is greater than R, then a new action part value for rule K for all rules is calculated at step 440. Processing then returns to the calling routine shown in FIG. 9, step 406, to compute the inference error.

The inference error subroutine 410 is illustrated in more detail in FIG. 11. As previously discussed, the inference error is called from step 410 in FIG. 9. The inference error determination process initiates with the initialization of the inference error sum value E to zero (0) and the data index value to one (1) (step 462). The input data vector and output data are then read from the data access device 92 (FIG. 3). The fuzzy system output value for the p-th input value of the vector is then calculated by calculation module 94. A total sum of the inference error is then determined at step 468 and the data index value is incremented at step 469. Termination conditions are then tested. If the data index value P exceeds the total number of data, then the subroutine returns to FIG. 9 at step 410 in order to calculate the difference of the values (step 472).

Figure 12:
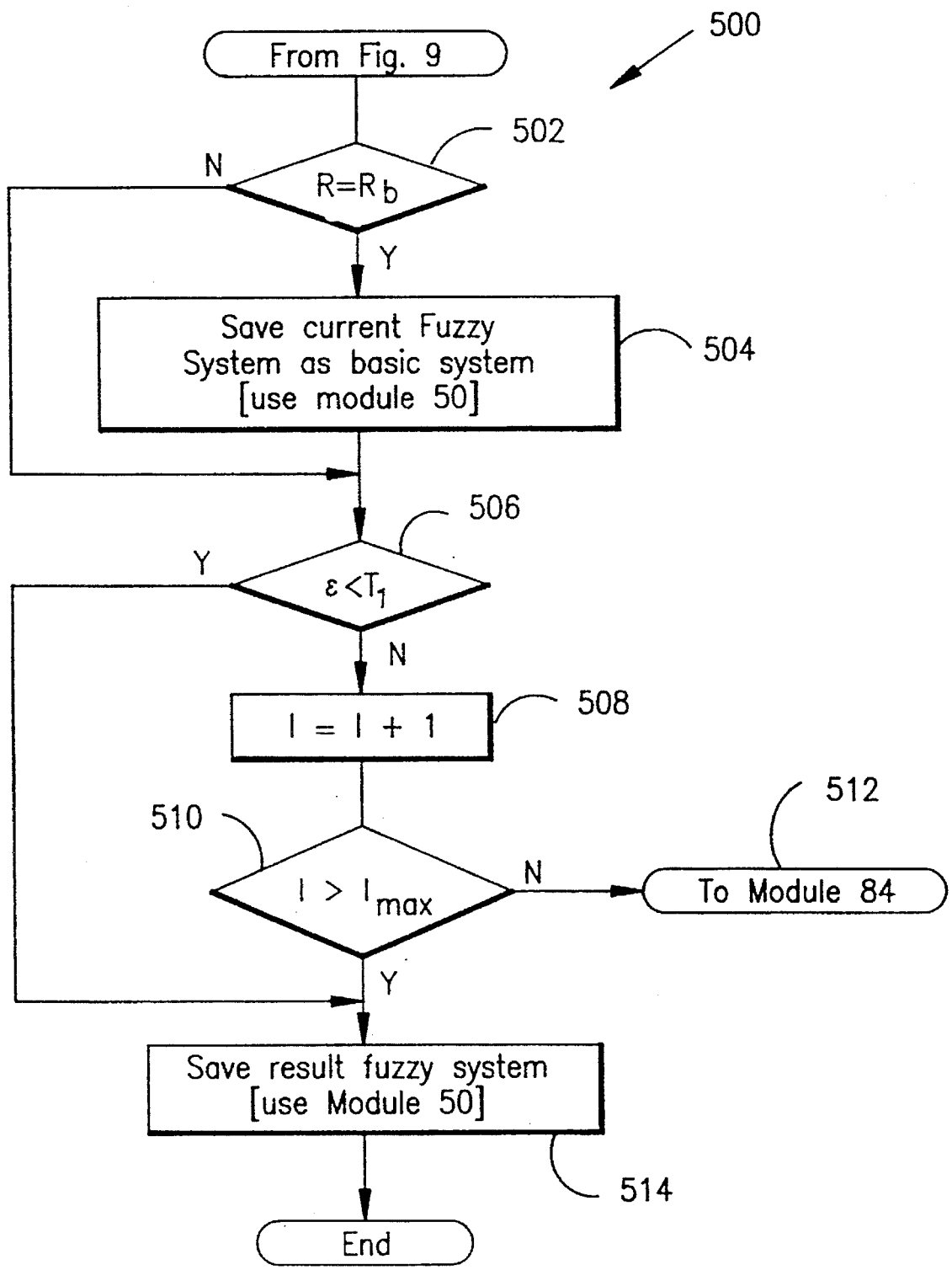
FIG. 12 represents the termination checking steps of the termination checker shown in FIG. 3.

FIG. 12 illustrates the processing steps 500 for the termination checker 90. At step 502, the total number of rules is set equal to the maximum number of rules for the basic fuzzy system. At step 504, the fuzzy system I/O module is called to store the calculated fuzzy rule system generated as a basic system. The saved system can either be outputted to the input/output device or stored in memory 20. The total inference error calculated in module 88 is then compared to the user given tolerance for the total inference error E. If the value of E is less than the user tolerance, then the result of the fuzzy system is saved in the fuzzy input/output module. If not, however, the iteration index value is incremented at step 508 and is compared to the maximum iteration variable at step 510. If the maximum iteration variable is not exceeded, then processing returns to the module 84 for calculating the inference error. Otherwise, the resulting fuzzy system calculated by the fuzzy rule generator is stored at step 514 in the memory 20. Termination processing then ends with the new fuzzy rules available for application to any device, system, program or database.

Specific examples of applications of the fuzzy rule generator described above are respectively illustrated in FIGS. 13–15. These applications represent only examples of the many uses and environments available for the present apparatus and method.

Figure 13:
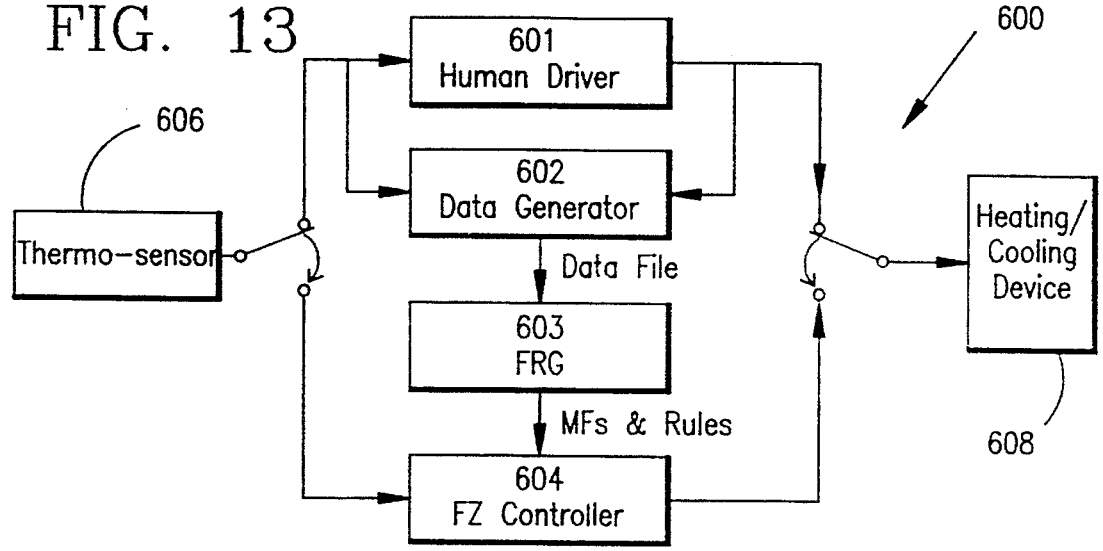
FIG. 13 is a block diagram showing a second embodiment of the invention in a heating/cooling temperature control system.

As shown in FIG. 13, the present system is employed for use in an automatic temperature control system, preferably for use in an automatic car air conditioner. As shown, the automobile driver or other operator provides a variety of data to a data generator 602. Data included in the generator are desired car temperature settings set through a standard temperature control lever on an automobile dashboard.

The system can operate in a learning mode in which the driver, while driving the vehicle, adjusts the temperature in the car to the desired level. A data generator then observes the driver's preferences and generates a model datafile similar to that generated by the data access module 92 in FIG. 3. The fuzzy rule generator 603, which can be implemented in the same manner as the fuzzy rule generator 10 of FIG. 3, automatically synthesizes fuzzy rules and membership functions that simulate the driver's temperature regulation characteristics based upon the model datafile provided by the data generator 602. The synthesized fuzzy control membership functions and rules are then supplied to the fuzzy controller 604 in order to more automatically regulate the room temperature in the car for heating/cooling device 608. The fuzzy controller can also receive thermo-sensor feedback information from the sensor 606 which can be provided as input values to the membership functions and rules provided by the fuzzy generator 603. As a result, a personalized temperature regulator for an automobile can be effectively implemented which efficiently synthesizes fuzzy rules and membership functions.

Figure 14:
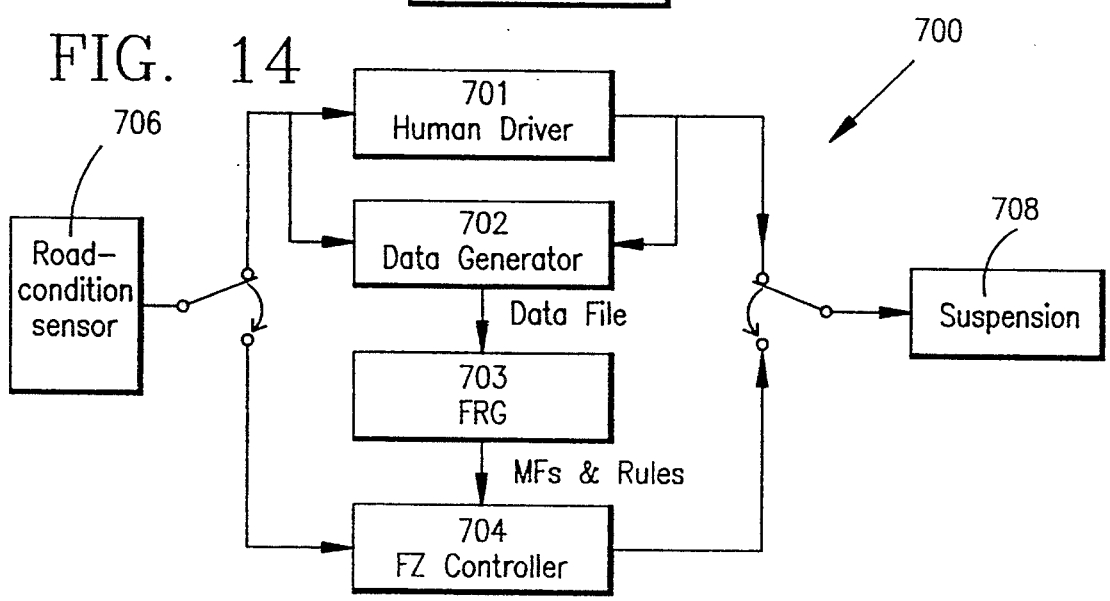
FIG. 14 is a hardware block diagram showing a third embodiment of the invention employed as an automatic suspension controller for an automobile.

FIG. 14 illustrates an automatic suspension controller application for the fuzzy rule generator described previously in FIGS. 3–12. As shown, a human driver 701 adjusts a suspension control knob to the desired suspension settings for comfort in driving an automobile. A data generator 702 then observes the driver's suspension preferences. As in the previous example, the data generator generates a model datafile indicating the various preferences for various road conditions. Fuzzy rule generator 703 then synthesizes the fuzzy controller, simulating the driver's suspension regulation characteristics. Those characteristics are based upon the provided model datafile from the data generator 702. An automatic control model is then set up in the fuzzy controller 704 based upon the membership functions and the rules generated from the fuzzy rule generator 703. Upon switching the fuzzy controller, automatic regulation of the suspension according to road conditions is implemented to the suspension system 708 using the road condition sensor feedback from the sensor 706.

Figure 15:
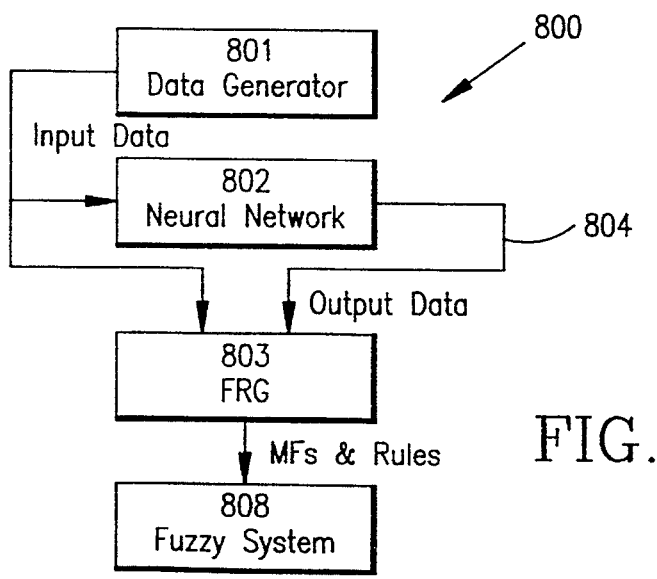
FIG. 15 is a hardware block diagram showing a fourth embodiment of the invention employed as a neural network to fuzzy system converter.

Finally, FIG. 15 illustrates a neural network to fuzzy rule converter generator 800. In this example, fuzzy rules are used to convert a neural network to an equivalent fuzzy system. A data generator 801 provides sample input data. The input data are fed both into a neural network 802 and into the fuzzy rule generator 803. The neural network then generates corresponding output data 804 which synthesizes a fuzzy system simulation of the neural network's input/output characteristics based upon the sampled input data from data generator 801 and the output characteristics of the neural network provided at step 804. Membership functions and rules are then generated which simulate the neural network's characteristics to be employed in a fuzzy system 808.

The present invention may be embodied in other specific forms without departing from the spirit or essential characteristics thereof. The present embodiments are presented as illustrative and are not restrictive within the scope of the invention being indicated by the attached claims rather than the foregoing description. All changes which come within the meaning and range of equivalency of the claims are intended to be embraced therein.

What is claimed is:

1. A fuzzy rule generator for synthesizing fuzzy rules, comprising:

input means for receiving a fuzzy system input vector;

system initialization means for setting an initial fuzzy system value;

inference error calculation means for determining an inference error value and for defining a target output value;

rule generating means responsive to said inference error calculation means for generating fuzzy rules wherein said target output value is assigned to a plurality of fuzzy rules as a weight value and membership functions are thereby generated from said fuzzy rules; and weight adjusting means for adjusting said weight value to reduce said inference error value such that said fuzzy rules and membership functions are added at a maximum error point in order to determine a peak value and width of each membership function and to minimize the number of additional fuzzy rules that are creased for each said fuzzy system input vector.

2. A system of claim 1 further comprising a level defining means for defining a level of an input vector to said fuzzy system whereby a level is assigned as a parameter to each of said membership functions by said inference error calculation means.

3. A system of claim 1 further comprising membership function width defining means for defining a width of said membership functions wherein peak values of said membership functions are adjusted to fit within said width defined by said width defining means in order to reduce the number of said membership functions and to minimize distribution and noise within said membership functions.

4. The system of claim 1 wherein said initial fuzzy system value defines a background rule such that a single rule is produced whose value represents any background environment covering an entire input vector of said fuzzy system.

5. The system of claim 4 wherein said background rule is a complement of a matching value of a premise for said fuzzy rules.

6. The system of claim 1 wherein said inference error calculation means calculates an inference error which represents an absolute difference between a fuzzy system output and a target output value.

7. The system of claim 6 wherein said rule generating means adds membership functions and generates fuzzy rules at said maximum error point defined by said inference error calculation means.

8. The system of claim 1 wherein an action part tuning means adjusts said weight value for all of said fuzzy rules generated by said rule generating means in order to reduce an overall inference error by tuning said weight value which adjusts a consequent part of said fuzzy rule.

9. The system of claim 8 wherein said action part tuning means processes by iterating until all of said plurality of fuzzy rules have been tuned by said action part tuning means.

10. The system of claim 1 further comprising an input/output processing means for processing input/output data, which includes:

(a) data access means for reading input and output data from a user-provided datafile;

(b) fuzzy inference calculating means for computing fuzzy inference outputs for a given input data vector; and (c) input/output means for retrieving input/output vectors from a memory, a user keyboard or a controlled device.

11. The system of claim 10 wherein said rule generating means further comprises a controller for providing fuzzy inference control.

12. The fuzzy system of claim 10 wherein said data access means provides datafiles consisting of ASCII floating point data, said ASCII data being organized into an input variable index, a total number of input variables value, a data index number, and a number representing said total number of data.

13. The fuzzy system of claim 10 wherein said inference error calculation means determines a fuzzy system output whereby values are defined in terms of a membership function for each said input from said data access device such that each membership function performed by said fuzzy inference calculating means forms an isosceles triangle having a defined center value.

14. The fuzzy system of claim 10 wherein said input/output means downloads and uploads said input and output data from said user-provided datafile to and from an external memory and also constructs fuzzy system file formats in order than parameters are appropriately assigned to data.

15. The system of claim 1, further comprising a basic fuzzy system structure which includes said input vector, said initial fuzzy system value, said inference error, said target output value and said fuzzy rules.

16. The system of claim 15 further comprising a termination checking means to save said basic fuzzy system structure, and to check termination conditions.

17. The system of claim 16, wherein said savings task is accomplished by downloading current fuzzy system structures into an external file after predetermined number of rules have been adjusted, wherein conditions for downloading are appropriate if:

(a) iteration counters set in said system initialization means exceed a maximum iteration value; and (b) a sum of said inference error values is less than a predetermined tolerance.

18. A process for efficiently generating fuzzy rules comprising the steps of:

initializing a fuzzy system to a default value;

calculating an inference error by determining an absolute difference between a fuzzy system output and a target output value;

identifying a maximum inference error input vector and output value;

generating fuzzy rules wherein said target output value is assigned to a plurality of said fuzzy rules as a weight value;

generating membership functions responsive to said fuzzy rules; and adjusting said weight value to reduce said inference error such that said fuzzy rules and said membership functions are added at a maximum error point in order to determine a peak value and a width of each said membership function and to minimize the number of additional fuzzy rules that are created.

19. The process of claim 18 wherein said initializing step is accomplished by setting said fuzzy system to user-defined settings or by defining said system through a background default rule designed to cover an entire input space of said fuzzy system.

20. The method of claim 18 further comprising the step of adding a plurality of membership functions and rules such that said maximum inference error point is within a peak value and a width.

* * * * *